United States Patent Office 2,795,268
Patented June 11, 1957

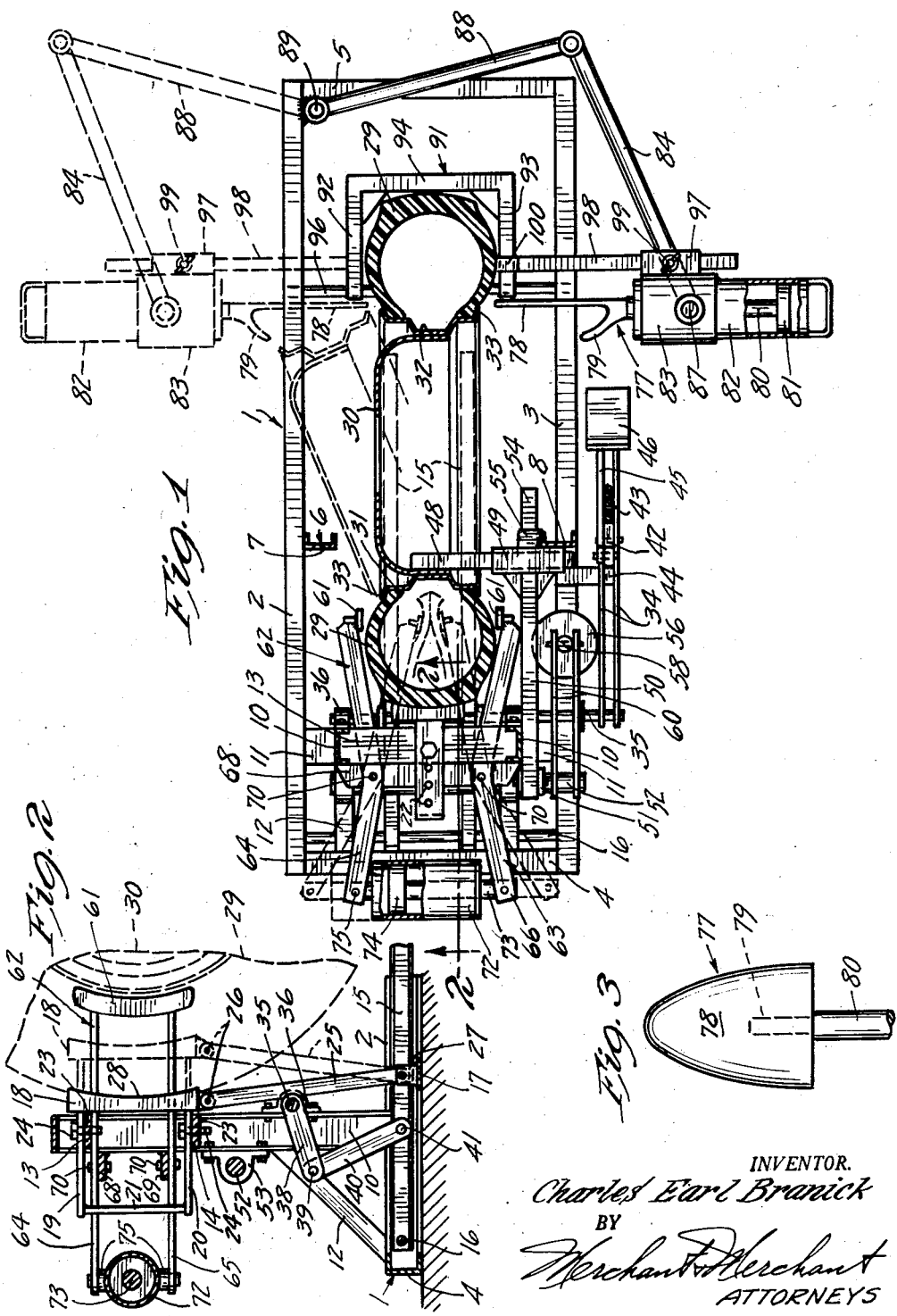

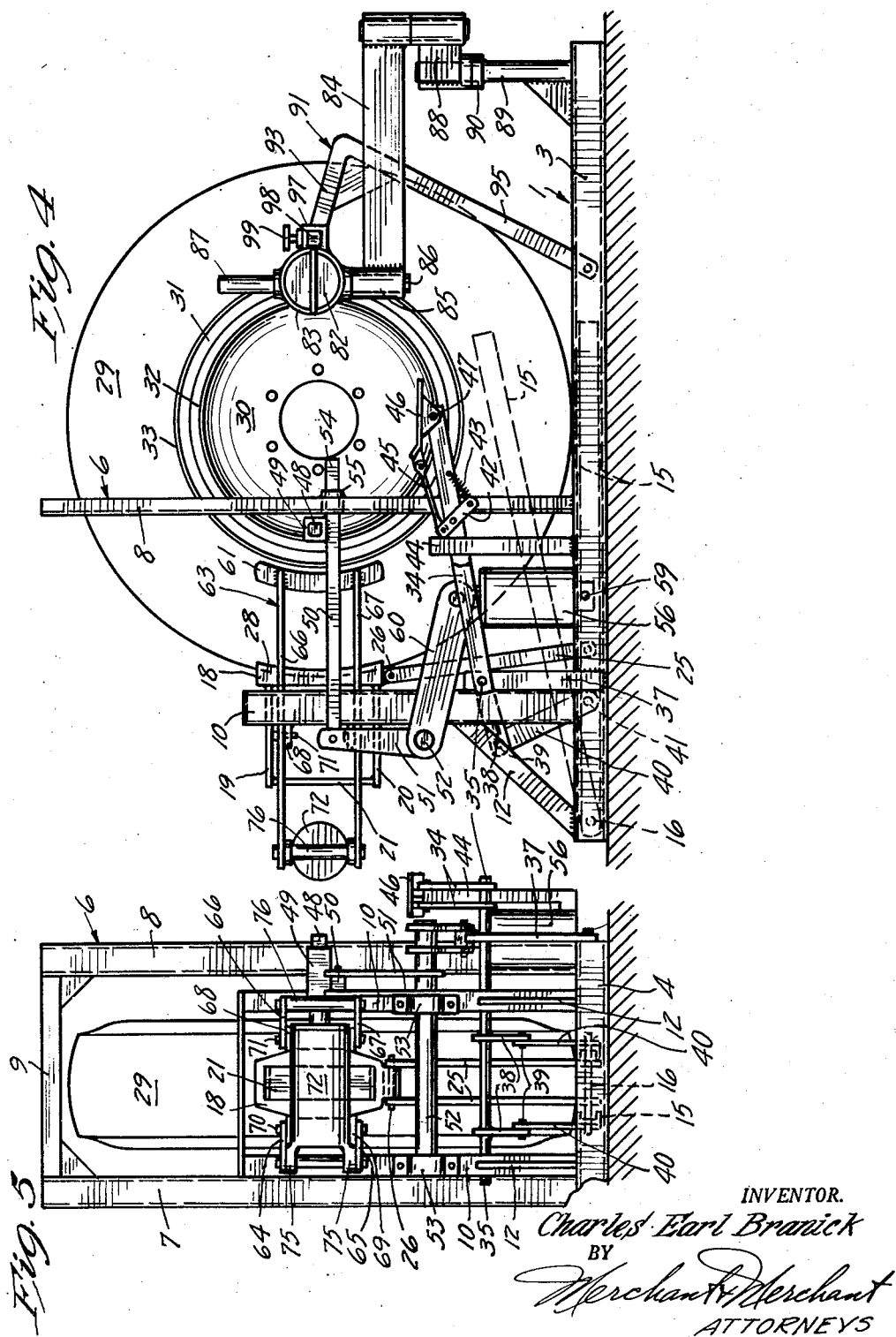

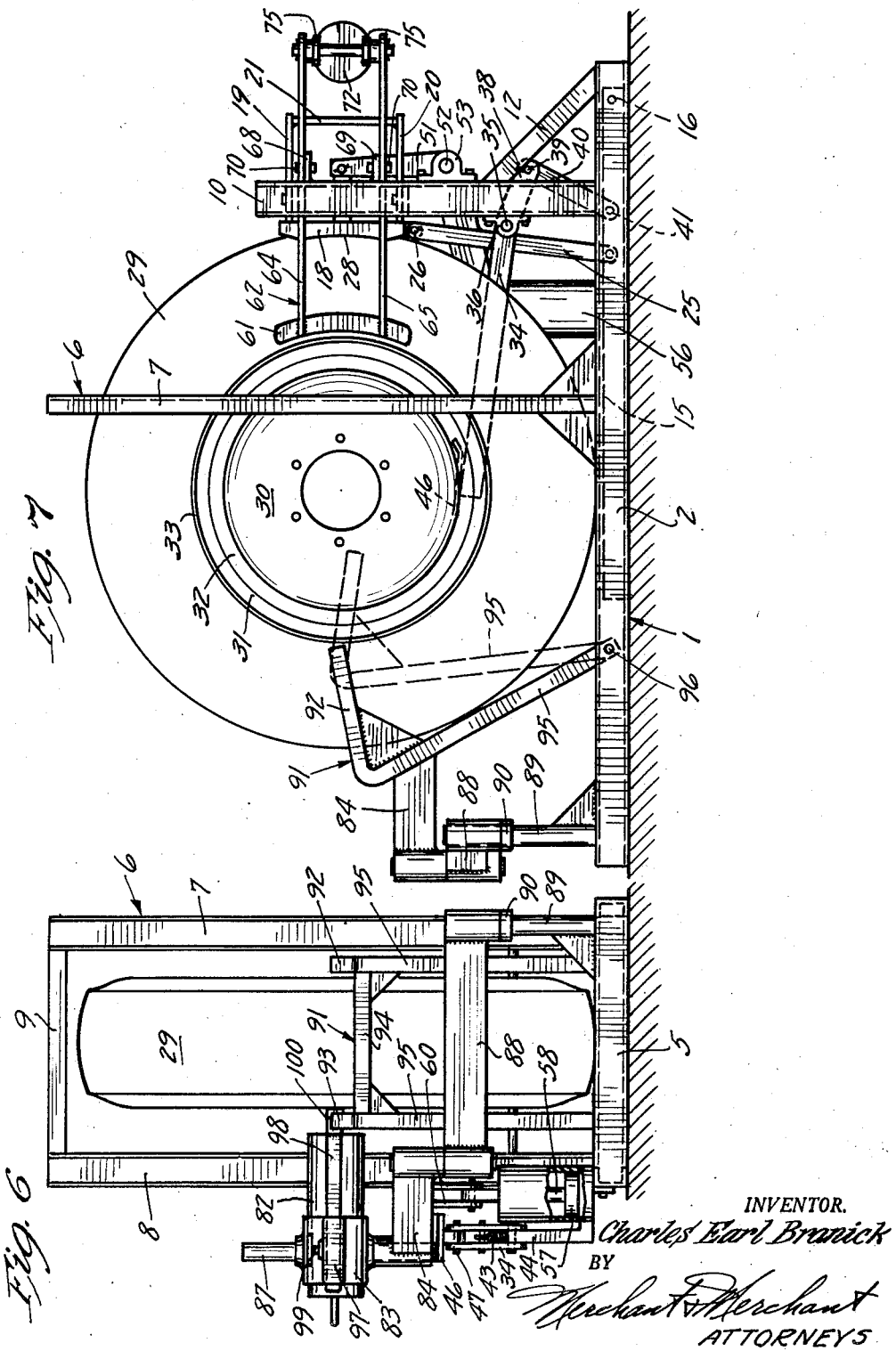

2,795,268

DEVICE FOR MOUNTING AND DISMOUNTING TUBELESS TIRES ON DROP CENTER RIMS

Charles Earl Branick, Fargo, N. Dak.

Application November 4, 1955, Serial No. 544,947

10 Claims. (Cl. 157—1.28)

My invention relates generally to devices for dismounting pneumatic tires from wheel rims and mounting tires thereon, and more particularly to such devices utilized in connection with wheel rims of the drop center type.

More specifically, my invention relates to a tire changing device which is particularly adapted for use with tires of the tubeless variety.

An important object of my invention is the provision of a tire changing device having power driven apparatus for breaking the tire beads loose from the bead retaining flange portions of wheel rims, and other power driven apparatus for causing the relative movement between the rim and the tire to completely separate the same.

Another object of my invention is the provision of means for moving the rim in a direction to receive portions of the tire beads in the reduced diameter drop center portion of the rim after the beads are separated from the rim flange.

Still another object of my invention is the provision of a tire changing device as set forth which is quickly and easily adjusted to operate on tires of various sizes and diameters.

Another object of my invention is the provision of a tire changing device which is adapted for use both in mounting a tire on a wheel as well as dismounting the same without the addition or removal of parts and without the use of separate tools.

Another object of my invention is the provision of a device as set forth in which a minimum of manual effort is expended in the removal of a tire from or replacement thereof on a wheel.

Another object of my invention is the provision of a tire changing device of the above type which is highly efficient in operation, and which is rugged in construction and durable in use.

The above and still further highly important objects and advantages of my invention will become apparent from the following detailed specification, appended claims and attached drawings.

Referring to the drawings which illustrate the invention, and in which like characters indicate like parts throughout the several views:

Fig. 1 is a view in plan of a tire changing device built in accordance with my invention, some parts being broken away and some parts shown in section;

Fig. 2 is a fragmentary view partly in side elevation and partly in vertical section, taken substantially on the line 2—2 of Fig. 1;

Fig. 3 is a fragmentary detail in elevation of a wheel rim engaging thrust member of my invention;

Fig. 4 is a view in side elevation of my tire changing device, some parts being broken away and some parts being shown in section;

Fig. 5 is a view in end elevation as seen from the left to the right with respect to Fig. 4;

Fig. 6 is a view in end elevation as seen from the right to the left with respect to Fig. 4; and Fig. 7 is a view in side elevation as seen from the opposite side with respect to Fig. 4.

In the preferred embodiment of the invention illustrated, a frame structure indicated generally at 1 is shown as comprising a base portion which involves a pair of elongated, laterally spaced parallel base members 2 and 3 and connecting end members 4 and 5 at the opposite ends of the elongated members 2 and 3. The frame 1 further includes an inverted generally U-shaped frame 6 comprising vertically extended frame elements 7 and 8 each welded or otherwise rigidly secured at its lower end to a respective base member 2 and 3, and a cross member 9 anchored to the upper ends of the vertical members 7 and 8. Intermediate the frame 6 and the end base member 4 is a second vertically disposed frame comprising a pair of vertically disposed frame members or bars 10 secured at their lower ends to adjacent ones of the base members 2 and 3 by cross bars 11, and braced by diagonal frame members 12 extending angularly upwardly from the base frame member 4 to the intermediate portions of the vertical members 10. The members 10 are connected at their upper end and intermediate portions by upper and lower cross bars 13 and 14 respectively.

Means for supporting a tire in the frame structure 1 comprises a pair of laterally spaced parallel tire supporting beams 15 that are pivotally mounted at one end to a transverse shaft 16 that is journalled in the base members 2 and 3 in closely spaced relation to the base end member 4. The supporting beams 15 extend longitudinally of the frame 1 and normally rest upon a crossbar 17, see particularly Fig. 2.

A stop element in the nature of a pad 18 is provided with a pair of vertically spaced, horizontally disposed plate-like members 19 and 20 which rest upon the crossbars 13 and 14 respectively, and which are connected at their rear ends by a vertically extended brace member 21. The plate-like members 19 and 20 are each provided with a plurality of longitudinally spaced holes 22 selectively alignable with axially aligned openings 23 in the crossbars 13 and 14, and for the reception of lock pins or bolts 24, whereby the stop element or pad 18 may be locked in a selected position with respect to the crossbars 13 and 14, longitudinally of the frame structure 1. For further supporting the stop pad 18, I provide a pair of laterally spaced legs 25 pivotally secured at their upper ends to the pad 18, as indicated at 26, and at their lower ends to a mounting bracket 27 rigidly secured to the cross member 17 between the tire supporting beams 15. Preferably, and as shown, the pad 18 is provided with a forwardly disposed concave surface 28 which is adapted to abut a portion of the road engaging crown surface of a vertically disposed tire supported on the beams 15, whereby to limit rolling movement of the tire in one direction. In the drawings a conventional truck tire of the tubeless variety is indicated at 29, said tire being mounted on a wheel 30 having a so-called "drop center" rim 31. The axially central reduced diameter portion or drop center is indicated at 32. The rim 31 is further provided with tire bead engaging and confining rim flanges 33 of the well-known type.

As shown, the common axis of the tire 29 and wheel 30 is disposed at a common level with the central portion of the pad 18. For the purpose of utilizing my tire changing device with tires of various sizes or diameters, I provide means for raising and lowering the tire supporting beams 15 about the axis of the shaft 16, now to be described. A bifurcated lifting lever is mounted fast at its rear end to a shaft 35 which extends transversely of the frame structure and which is journalled in bearings 36 on the frame members 10, and in the upper end of a supporting leg 37 which is welded to the base member 3 and which extends upwardly therefrom. A pair of laterally spaced crank arms 38 are mounted fast on the shaft 35 between the frame members 10 and have their free ends pivotally secured, as indicated at 39, to a pair of rigid links 40 that are pivotally secured one each to a different one of the supporting beams 15, as indicated at 41. It will be noted that downward swinging movement of the bifurcated lifting lever 34 will cause rotation of the shaft 35 in a direction to impart swinging movement to the supporting beams 15 in an upward direction from their lower position of Figs. 2 and 4 toward their dotted line position of Fig. 4. With this arrangement, tires of smaller diameter than that of the tire 29 may be raised to a point where the axis thereof is substantially level with the central portion of the abutment pad 18. Means for locking the supporting beams 15 at a given position comprises a gripping bar 42 that is pivotally secured intermediate its ends to the bifurcated lifting lever 34 intermediate the ends thereof. One end of the gripping bar 42 is yieldingly biased, by a spring 43 toward frictional locking engagement with a vertically disposed rigid leg 44 that is welded or otherwise secured at its lower end to the base member 3, and which extends upwardly between the laterally spaced elements comprising the bifurcated lever 34. The gripping bar 42 is connected, by means of a rigid link 45 to a treadle element 46 that is pivotally connected to the forward end of the lever 34 as indicated at 47, see Fig. 4. It will be noted that pivotal movement of the treadle element 46 in a clockwise direction with respect to Fig. 4, such as caused by pressure of the operator's foot on the outer end thereof, will impart rocking movement to the gripping bar 42 in a direction to release the same from gripping engagement with the leg 44, so that the lifting lever 34 may be raised or lowered. Thus, when pressure upon the outer end of the treadle element 46 is released, the spring 43 will impart pivotal movement to the gripping bar 42 in a direction to cause frictional rocking engagement therebetween and the leg 42 to maintain the supporting beams 15 at the desired elevation.

For holding the tire 29 in abutting engagement of the aforesaid road engaging crown portion thereof with the pad 18, I provide a wheel rim engaging bar 48 which extends in a direction generally axially with respect to the tire 29, and which is mounted for longitudinal sliding movement in a tubular head 49 that is welded or otherwise rigidly secured to the forward end of a rigid arm 50 which extends generally longitudinally with respect to the frame structure 1, and which is pivotally mounted at its rear end to the upper end of a crank arm 51, the lower end of which is mounted fast on a transverse shaft 52. The shaft 52 extends transversely of the frame structure and is journalled in bearings 53 mounted on the vertical frame members 10. A slide bar 54 forms an extension of the arm 50 forwardly of the head 49, and is mounted for longitudinal sliding movements in a tubular guide 55 welded or otherwise rigidly secured to the vertically disposed frame member 8, see Fig. 1. For a purpose which will hereinafter be described, I provide means for rotating the shaft 52 in a direction to cause movement of the rim engaging bar 48 in opposite directions radially of the tire and wheel toward and away from the stop-pad 18. The above-mentioned means comprises a vertically disposed fluid pressure cylinder 56 having therein a piston 57, and a piston rod 58 secured to the piston 57 and extending upwardly through the upper end of the cylinder 56. The cylinder 56 is suitably anchored at its lower end to the base member 3 as indicated at 59 in Figs. 4 and 6. The upper end of the piston or plunger rod 58 is pivotally connected to the outer end of a crank arm 60, the inner end of which is mounted fast on one end of the transverse shaft 52. The cylinder 56 may be assumed to be connected to a suitable source of fluid under pressure, not shown, by means of the usual conduits and control valves, also not shown.

A pair of tire side wall engaging members in the nature of circumferentially extended presser feet 61 are rigidly secured to one of a pair of bifurcated lever arms 62 and 63, the former of which comprises upper and lower arm sections 64 and 65 respectively, and the latter of which comprises upper and lower lever arm sections 66 and 67 respectively. The upper and lower lever arm sections 64 and 65 of the lever arm 62 are pivotally secured on aligned vertical axes to a vertically spaced pair of bracket elements 68 and 69, and as indicated at 70. The lever arm sections 66 and 67 of the lever arm 63 are likewise pivotally secured intermediate their ends to the brackets 68 and 69 respectively, as indicated at 71, and in spaced relation to the axis of the pivotal connections 70 transversely of the frame structure 1.

It will be noted that the presser feet 61 are disposed at substantially the same level as the stop-pad 18 and of the axis of the tire 29. Preferably, the stop element or pad 18 is adjusted longitudinally with respect to the supporting frame, so that, when the road engaging crown portion of the tire is in abutment with the stop pad 18, the presser feet 61 will be positioned to engage the side walls of the tire 29 in closely radially outwardly spaced relation to the rim flanges 33. Means for moving the lever arms 62 and 63 in directions to cause the presser feet 61 to break the tire beads loose from their respective rim flanges 33 and move the engaged side wall portions and adjacent bead portions of the tire 29 into register with the axially central reduced diameter portion 32 of the rim 31, comprises a fluid pressure cylinder 72 and a cooperating plunger rod 73 which is connected to a piston 74 mounted for reciprocatory movement in the cylinder 72. The cylinder 72 and plunger rod 73 extend transversely of the frame structure 1, the cylinder 72 having diametrically opposed connecting bosses 75 that are connected to the lever arm sections 64 and 65 of the lever arm 62. With reference to Figs. 4 and 5, it will be seen that the outer end of the plunger rod 73 is connected to a crosshead 76 and that the rear ends of the lever arm sections 66 and 67 are pivotally connected to opposite ends of the crosshead 76. Like the cylinder 56, the cylinder 72 may be assumed to be connected to a source of fluid under pressure, not shown, by means of suitable conduits and a control valve also not shown. It will be understood, however, that when fluid under pressure is introduced to one end of the cylinder 72, the pressure thereof will cause the cylinder 72 to move in one direction and the piston 74 to move in the opposite direction, thus swinging the lever arms 62 and 63 toward each other to separate the beads of the tire 29 from sealing engagement with the rim flanges 33, and collapsing the side walls of the tire 29 so that the adjacent bead portions thereof are in register with the drop center portion 32 of the rim 31, as shown by dotted lines in Fig. 1.

When a portion of the tire 29 has been laterally collapsed by the lever arms 62 and 63, it is then necessary that the collapsed portion of the beads of the tire 29 be received within the drop center portion 32 of the rim 31. This is accomplished by the introduction of fluid under pressure to the cylinder 56 below the piston 57 therein. Subsequent upward movement of the piston 57 will cause upward swinging movement to be imparted to the crank arm 60, resulting in rearward longitudinal movement of the arm 50 and rim engaging bar 48. The wheel 30 and rim 31, being relatively rigid, this rearward movement of the rim will cause a separation therebetween and the beads of the tire 29 diametrically opposite the stop pad engaged portion of the tire, whereupon the rim adjacent said diametrically opposite portion of the tire may be moved in a direction generally axially with respect to the tire to be totally free thereof. Obviously, in order to totally free the rim from the tire, the rim engaging bar 48 must be moved away from the rim a sufficient distance to permit removal of the rim from the tire. This is accomplished by merely shifting the bar 48 longitudinally in the tubular head 49.

For the purpose of quickly and easily removing the wheel and rim from the tire after the above-mentioned bead portions thereof have been received in the drop center portion 32 of the rim, with a minimum expenditure of manual effort, I provide a thrust member comprising a cross sectionally arcuate spade-like blade portion 78 which is insertable between the marginal edges of the rim flanges 33 and the adjacent bead portions of the tire 29 diametrically opposite the collapsed portion of the tire, and an engaging hook 79. The thrust member 77 is mounted on the outer end of a plunger rod 80, the inner end of which is secured to a piston 81 axially slidably mounted in a fluid pressure cylinder 82. Like the cylinders 56 and 72, the cylinder 82 may be assumed to be connected to a suitable source of fluid under pressure, not shown, by means of conduits and control valve means, also not shown. The cylinder 82 is rigidly held in a mounting sleeve 83 that is carried by an arm 84. The arm 84 is provided at one end with a vertically extended mounting tube 85 that receives a spindle 86 which is rigidly secured to and depends from the mounting sleeve 83. The spindle 86 is pivotally movable and axially slidable in the mounting tube 85 whereby the cylinder 82 may be swung on the axis of the spindle 86 to any desired position. I do not wish to be limited to the exact connection shown between the cylinder 82 and the supporting arm 84, the above-described means being merely one example by which such mounting is accomplished. A second spindle 87 is shown as extending from the sleeve 83 in diametrically opposed relationship to the spindle 86 for a purpose which will hereinafter become apparent. The end of the arm 84 opposite the mounting tube 85 is pivotally connected to one end of a cooperating arm 88 for swinging movements with respect thereto on a vertical axis. The opposite end of the arm 88 is journalled on the upper end of a shaft 89 the lower end of which is welded or otherwise rigidly secured in the corner defined by the base members 2 and 5. A collar 90 on the shaft 89 limits downward axial movement of the arm 88 with respect to the shaft 89. It will be appreciated that the arm 88 is capable of pivotal movement of a full circle about the axis of the shaft 89, and that the arm 84 is likewise capable of independent swinging movement with respect to the arm 88 about an arc of 360°, so that the mounting sleeve 83 and the parts carried thereby may be placed in an infinite number of positions within the combined reach of the supporting arms 84 and 88.

A generally U-shaped tire retainer, indicated generally at 91, includes a pair of laterally spaced legs 92 and 93 and a connecting portion 94, and is connected to the upper ends of a pair of laterally spaced legs 95 that are pivotally connected at their lower ends to a shaft 96 extending transversely of the supporting frame structure 1 and secured at its opposite ends to the base members 2 and 3. The pivotal connection of the legs 97 to the frame structure allows the U-shaped member to be moved between a tire engaging operative position shown by full lines in Figs. 1, 4, 6 and 7, and an inoperative position wherein the intermediate portions of the legs 95 rest on the end frame member 5. With this arrangement and with the arms 84 and 88 swung to an out-of-the-way position, such as indicated by dotted line in Fig. 1, a relatively heavy tire may be rolled into operative position on the supporting beams 15 without the necessity of manually lifting the same. The cylinder mounting sleeve 83 is provided at one side with an elongated guide portion 97 in which is mounted a connecting bar 98 for longitudinal sliding movements in a direction parallel to the axis of the cylinder 82. A set screw or the like 99, screw threaded in a side wall of the guide portion 97, is adapted to releasably lock the connecting bar 98 in desired set position with respect to its longitudinal movement. At its inner end, the connecting bar 98 is provided with a hook 100 which is adapted to receive selectively the legs 92 and 93 of the U-shaped retainer 91. Engagement of either leg 92 or 93 by the hook 100, when fluid under pressure is introduced to the outer end of the cylinder 82 causes the retainer engaged portion of the tire 29 to act as a base of resistance for the axial thrust of the thrust member 77, so that there is very little if any necessity for otherwise holding the tire rigid in the frame structure while the cylinder 82 is under pressure to cause removal of the wheel 30 from the tire 29. As indicated by dotted lines in Fig. 1, the arms 84 and 88 may be readily moved to a position for installing a drop center rim equipped wheel to the tire. In order that the connecting rod 98 may be properly hooked to the leg 92 of the retainer 91, it is merely necessary to invert the sleeve 83 and cylinder 82 so that the spindle 87 is received in the mounting tube 84, and the arms 84 and 88 swung to their dotted line positions of Fig. 1.

When it is desired to remove the wheel 30 from the tire 29, the tire is rolled into place on the supporting beams 15 and, if necessary, the lifting lever 34 is manipulated to raise the tire until the axis thereof is substantially level with the central portion of the stop pad 18. The stop pad 18 is then adjusted to position the tire with respect to the presser feet 61 so that said presser feet are located to engage the side walls of the tire 29 immediately radially outwardly of the rim flanges 33. The rim engaging bar 48 is then moved radially and axially with respect to the wheel 30 so that the same engages the rim and holds the tire against the stop pad 18. Thereafter, fluid, preferably air, is introduced to the cylinder 72 under sufficient pressure to cause outward movement of the adjacent ends of the lever arms 62 and 63 and laterally inward movement of the presser feet 61 to break the adjacent portions of the tire beads away from sealing engagement with the rim flanges 33, and collapse the engaged side wall portions and adjacent bead portions of the tire so that the same will register with the drop center portion 32 of the rim 31. Fluid under pressure is then introduced to the bottom portion of the cylinder 56 whereby to cause movement to be imparted to the rim engaging bar 48 in a direction toward the stop pad 18. This movement causes the wheel 30 to move bodily toward the stop pad 18 to cause reception of the collapsed bead portions of the tire in the adjacent portion of the drop center of the rim. This movement of the wheel 30 causes the diametrically opposite portion thereof to be moved radially away from the opposite portion of the tire 29 so that the blade portion 78 of the thrust member 77 may be inserted therebetween. The retainer 91 is then moved upwardly to partially encompass the adjacent portion of the tire 29 and the hook 100 of the connecting bar 98 is applied to the adjacent leg 93. Fluid under pressure is then introduced to the outer end of the cylinder whereby to cause the rim 31 to be engaged by the hook 79 and the hook engaged portion of the rim to be moved generally axially outwardly from operative engagement with the tire 29. During this last operation or directly thereafter, the rim engaging bar 48 may be moved radially inwardly or retracted axially from engagement with the wheel 30 to facilitate removal of the wheel by the thrust member 77. When it is desired to mount the wheel 30 in the tire 29, the lever arms 62 and 63 are utilized to first collapse the adjacent side walls and bead portions of the tire, and the wheel 30 is manually placed thereon in substantially the position indicated by dotted lines in Fig. 1. The cylinder 82 is then positioned as indicated by dotted lines in Fg. 1 and fluid under pressure introduced to the outer end thereof to quickly and easily move the adjacent side of the wheel and rim into operative alignment with the tire. The thrust element 77 is then retracted from its position between the beads of the tire 29 and the rim flanges 33 after which the wheel 30 may be manually shifted to permit the beads of the tire to approach their normal positions of sealing engagement with the rim flanges 33, Then when air is introduced to the interior of the tire, air pressure within the tire and the normal tendency of the tire to assume its inflated condition will cause the beads of the tire to move into sealing engagement with the rim flanges 33. Axial retraction of the rim engaging bar 48, and movement of the U-shaped retainer 91 to its heretofore described inoperative position, will permit the tire to be then rolled away from the machine. Obviously, if the tire is of a size necessitating elevation thereof by the supporting beams 15, the treadle 46 and lifting lever 34 will be manipulated to lower the lifting beams to their lowermost position before the wheel equipped tire is removed.

While I have shown and described a preferred embodiment of my tire changing device, it will be understood that the same is capable of modification without departure from the spirit and scope of the invention as defined in the claims.

What I claim is:

1. In a device for removing pneumatic tires from and mounting the same on drop center mounting rims, frame structure for receiving and holding a tire element, a pair of spaced tire side wall engaging members mounted for relative movement toward and away from each other, means for imparting said relative movement to the side wall engaging members to collapse the engaged side wall portions and adjacent bead portions of the tire element so that the same may be received in the axially central reduced diameter portion of a drop center rim element, a thrust member mounted on said frame structure for movements in opposite directions generally axially of said tire and rim elements, said thrust member engaging one of said elements diametrically opposite the collapsed portion of the tire element to move said one of the elements in said generally axial direction relative to the other one of said elements, and a rigid member engaging said other element to hold the same against common axial movement with said one of the elements.

2. In a device for removing pneumatic tires from and mounting the same on drop center mounting rims, frame structure for receiving and holding a tire, a pair of opposed tire side wall engaging members mounted for relative movement toward and away from each other, means for imparting said relative movement to the side wall engaging elements toward each other to collapse the engaged side wall portions and adjacent bead portions of the tire so that the same may be received in the axially central reduced diameter portion of a drop center rim, a thrust member mounted on said frame for movements in opposite directions generally axially of said tire end rim, said thrust member engaging said rim diametrically opposite the collapsed portion of the tire to move the rim in said generally axial direction relative to said tire, and a rigid member engaging said tire to hold the same against common axial movement with said rim.

3. In a device for removing pneumatic tires from and mounting the same on drop center mounting rims, frame structure for receiving and holding a tire, a pair of opposed tire side wall engaging members mounted for relative movement toward and away from each other, means for imparting said relative movement to the side wall engaging members toward each other to collapse the engaged side wall portions and adjacent bead portions of the tire so that the same may be received in the axially central reduced diameter portion of a drop center rim, a thrust member mounted on said frame for movements in opposite direction generally axially of said tire and rim and having a portion axially movable between a bead portion of the tire and said rim diametrically opposite the collapsed portion of the tire, said thrust member having a rim engaging hook for moving said rim with respect to said tire upon movement of said thrust member in one direction, and a rigid member engaging said tire to hold said tire against common axial movement with said rim when the rim is engaged by said hook.

4. In a device for removing pneumatic tires from and mounting the same on drop center mounting rims, frame structure for receiving and holding a tire, a stop element mounted on said frame structure for abutment with a road engaging crown surface portion of the tire to limit movement thereof in one direction, a pair of opposed tire side wall engaging members mounted for relative movement toward and away from each other, means for imparting said relative movement to the side wall engaging members toward each other to collapse the engaged side wall portions and adjacent bead portions of the tire so that the same may be received in the axially central reduced diameter portion of a drop center rim, means including a rim engaging bar for moving said rim toward said stop element to receive the collapsed bead portion of the tire in the drop center portion thereof, means mounting and guiding said bar for movement generally radially with respect to said tire and for independent movements between an operative rim engaging position and an inoperative position spaced therefrom in a direction generally axially of said tire, and means carried by the frame structure and including a thrust member engageable with said rim diametrically opposite the collapsed portion of the tire to move said rim with respect to the tire in a direction generally axially thereof.

5. In a device for removing pneumatic tires from and mounting the same on drop center mounting rims, frame structure for receiving and holding a tire, a stop element mounted on said frame structure for abutment with a road engaging crown surface portion of the tire to limit movement thereof in one direction, a pair of opposed tire side wall engaging members mounted for relative movement toward and away from each other, means for imparting said relative movement to the side wall engaging members toward each other to collapse the engaged side wall portions and adjacent bead portions of the tire so that the same may be received in the axially central reduced diameter portion of a drop center rim, a rim engaging bar operative to move said rim toward said stop element to receive the collapsed bead portion of the tire in the drop center portion of said rim, means mounting and guiding said bar for movements generally radially with respect to said tire, said last-mentioned means including a rigid arm mounted in said frame structure for longitudinal reciprocatory movements in a direction generally radially with respect to said tire, a power-operated device, and linkage connecting the power-operated device to said arm, and means carried by the frame structure and including a thrust member engageable with said rim diametrically opposite the collapsed portion of the tire to move said rim with respect to the tire in a direction generally axially thereof.

6. In a device for removing pneumatic tires from and mounting the same on drop center mounting rims, frame structure for receiving and holding a tire, a pair of opposed tire side wall engaging members mounted for relative movement toward and away from each other, means for imparting said relative movement to the side wall engaging members toward each other to collapse the engaged side wall portions and adjacent bead portions of the tire so that the same may be received in the axially central reduced diameter portion of the drop center rim, said frame structure including a generally U-shaped retained adapted to partially encompass a crown and side wall portion of said tire diametrically opposite said side wall engaging elements to hold said tire against axial movement, said retainer being movable in said frame structure between an operative position engaging said tire and an inoperative position remote therefrom, and means carried by said frame structure and including a thrust member having a portion movable between a bead portion of the tire and said rim diametrically opposite the collapsed portion of the tire and in a direction axially thereof, said thrust member having a rim engaging hook for moving said rim with respect to the tire upon said movement of the thrust member.

7. The structure defined in claim 6 in which said last-mentioned means includes a power head for imparting movements to said thrust member and in further combination with means for releasably locking said power head to said U-shaped retainer, whereby thrust applied to the rim in one direction is applied equally to the U-shaped member in the opposite direction.

8. In a device for removing pneumatic tires from and mounting the same on drop center mounting rims, frame structure for receiving and holding a tire, a pair of opposed tire side wall engaging members mounted for relative movement toward and away from each other, means for imparting said relative movement to the side wall engaging members toward each other to collapse the engaged side wall portions and adjacent bead portions of the tire so that the same may be received in the axially central reduced diameter portion of a drop center rim, a thrust member including, a cross sectionally arcuate blade adapted to be received between the beads of said tire and said rim diametrically opposite said collapsed portion of the tire, and a rim engaging hook, and power operated mechanism for moving the thrust member in a direction axially of said tire to remove the rim therefrom.

9. The structure defined in claim 8 in further combination with means mounting said power operated mechanism for movements between opposite sides of said frame structure whereby said thrust member is applied selectively to opposite sides of said tire and rim to move said rim into or out of operative relationship with said tire.

10. The structure defined in claim 9 in which said mounting means for the power head comprises a pair of supporting arms connected together at one of their ends for relative swinging movements on a vertical axis, the free end of one of said arms being pivotally connected to said frame structure, and said power head being pivotally mounted on the free end of the other of said arms, the pivotal connections at the free ends of said arms being on axes parallel to the pivotal connection between said arms.

References Cited in the file of this patent
UNITED STATES PATENTS

| | | |
|---|---|---|
| 1,217,009 | Kavanagh | Feb. 20, 1917 |
| 1,302,734 | Tuttle | May 6, 1919 |
| 1,966,766 | Raby et al. | July 17, 1934 |
| 2,439,135 | Johnson et al. | Apr. 6, 1948 |
| 2,470,534 | Thomas | May 17, 1949 |
| 2,521,149 | Butler et al. | Sept. 5, 1950 |
| 2,534,950 | Butterfield et al. | Dec. 19, 1950 |
| 2,609,039 | Henderson | Sept. 2, 1952 |
| 2,695,659 | Athmann | Nov. 30, 1954 |